United States Patent [19]

Weeks, Jr. et al.

[11] 3,779,244

[45] Dec. 18, 1973

[54] DISPOSABLE FACE RESPIRATOR

[75] Inventors: Thomas Joseph Weeks, Jr., Valley Cottage, N.Y.; George Paul Reimschussel, Flemington, N.J.

[73] Assignee: Johns-Manville Corporation, New York, N.Y.

[22] Filed: Feb. 3, 1971

[21] Appl. No.: 112,364

[52] U.S. Cl. ............ 128/146.2, 55/527, 55/DIG. 35
[51] Int. Cl. ............................................. A61f 13/00
[58] Field of Search... 128/146.2, 146, 146.3–146.7, 128/139, 142.6, 140 R; 2/3–9, 206; 162/218, 219, 231; 55/527, DIG. 35

[56] References Cited
UNITED STATES PATENTS

| | | | |
|---|---|---|---|
| 3,620,214 | 11/1971 | Thackston | 128/146.2 |
| 3,333,585 | 8/1967 | Barghini et al. | 128/146.2 X |
| 3,042,035 | 7/1962 | Coanda | 128/146 |
| 3,220,409 | 11/1965 | Liloia et al. | 128/146.2 |
| 3,249,108 | 5/1966 | Terman | 128/146.2 |
| 2,922,418 | 1/1960 | Hefferman et al. | 128/142.6 |

FOREIGN PATENTS OR APPLICATIONS

| | | | |
|---|---|---|---|
| 892,262 | 3/1962 | Great Britain | 128/146.2 |

*Primary Examiner*—Richard A. Gaudet
*Assistant Examiner*—Henry J. Recla
*Attorney*—John A. McKinney, Robert M. Krone, Joseph J. Kelly and Ronald M. Halvorsen

[57] ABSTRACT

A respirator mask is formed by a filter medium that comprises a majority of the face portion of the mask and edge sealing means. The filter medium includes at least two layers of interfelted fibers: (a) a backing layer of fibers, and a binder, and (b) a filter layer including fibers having a fine diameter. The filter medium is formed by sequentially depositing solids on a foraminous mold having the desired shape of the interior of the mask, from separate aqueous slurries. A pressure differential is applied across the foraminous mold to cause the fluid portion of each slurry to pass through the mold and to deposit solids on the mold.

14 Claims, 11 Drawing Figures

PATENTED DEC 18 1973 3,779,244

INVENTORS,
THOMAS JOSEPH WEEKS, JR.
GEORGE PAUL REIMSCHUSSEL
BY Robert M. Krone
ATTORNEY

FILTER LAYER 10 X

BACKING LAYER 10 X

INVENTORS,
THOMAS JOSEPH WEEKS, JR.
GEORGE PAUL REIMSCHUSSEL

ATTORNEY

DISPOSABLE FACE RESPIRATOR

BACKGROUND OF THE INVENTION

1. Field of the Invention

This invention relates to a face respirator which is effective in filtering particulate and fibrous matter from the air. More particularly, it relates to a face respirator which can be discarded after use.

2. Description of the Prior Art

Face respirators have been used for many years in environments which are particularly noxious or unpleasant. In order to efficiently filter out fine dust and fibers, face respirators have often been quite elaborate in construction, consisting of cumbersome face pieces, special replaceable elements or inserts, breathing valves to facilitate inhalation and exhalation, and often other elements of special design and purpose.

While elaborate respirator designs, which often tend to be heavy, have been thought to be necessary for effective filtration in dust and fiber-laden environments, the discomfort experienced on wearing some respirators for a substantial length of time has often caused workers to ignore them and to continue breathing unfiltered air.

There are a number of masks on the market today which utilize a disposable filter element which fits into a permanent face-piece that is used over and over. Although some of these masks are relatively effective in removing particles from air, unfortunately the most effective ones have gained only modest acceptance. The face-pieces must be regularly repaired, maintained, and cleaned or they quickly become dirty and very unappealing from the wearer's point of view.

A particularly serious problem exists for construction and other workers, such as insulation installers, who are regularly exposed to dust and fiber-laden air at construction sites where no air quality control program is established. The transitory nature of the work makes difficult the establishment of a respirator program utilizing re-usable respirator masks which must be maintained and cleaned, and which have filter elements that must be regularly replaced.

The most common complaint by workers directed toward existing respiratory face masks is discomfort. Specifically, workers criticize the respirator masks for feeling "hot and clammy," for requiring excessive breathing effort, for providing a poor fit, for causing skin irritation and rashes, and for being stiff, and excessively bulky and heavy. A mask to be accepted and worn by workers should avoid these problems. Other criteria which should be satisfied include compatibility with eyeglases, no obstruction with downward vision and the ability to permit voice communication at short distances.

Surveys have shown that workers exposed to dust and fiber-laden air do not wear uncomfortable respirators, even when well-informed as to the deleterious effects on their health that can result from breathing such air when unfiltered.

Thus, there has been a continuing search for a respirator mask that is comfortable to wear, efficient, and inexpensive enough to be utilized for one day and then discarded.

Attempts have been made in the past to solve this problem by providing lighter weight face respirators, but these too have failed to overcome the problems of interference with talking and chewing, and have tended to be too hot to wear for long periods, and have irritated the skin of the wearer. Prior to this invention, no disposable face respirator has been commercially available which has been comfortable enough to be freely worn by workers for an entire working day and yet provide effective filtering performance.

OBJECTS OF THE INVENTION

An object of this invention is to provide a face respirator which functions efficiently, is comfortable to wear and which is economical enough to permit disposal of the mask after only limited use, such as for one day.

Additional objects and advantages of the invention will be set forth in part in the description which follows or will be obvious from the description, or may be learned by the practice of the invention.

SUMMARY OF THE INVENTION

The invention provides a respirator mask having edges that are comfortable to the contours of a wearer's face. A shape-retaining filter medium forms a major portion of the face piece of the mask, and includes (1) a backing layer of bonded interfelted resilient fibers, and (2) a filter layer overlying the backing layer. The filter layer is formed by an interfelted fibrous mass possessing a plurality of pores or interstices extending across the thickness of the filter layer, and includes at least about 4 percent by weight of fine diameter fibers and larger, resilient fibers. Edge seal means are provided for preventing passage of air between the edge portions of the filter medium and the wearer's face. The edge seal means and the filter medium are deformable to permit the wearer of the mask to conform the edge seal means to the contours of his face and thus prevent excessive leakage of air around the mask.

Preferably, the filter medium includes at least two backing layers with a filter layer interposed between the backing layers. This arrangement helps provide a stronger more resilient mask, and permits the elimination of or a reduction in the amount of binder in the filter layer.

The mask is produced by a process in which the filter medium is shaped to present edges that generally conform to a human face. The process produces filter media that are manually deformable to permit a wearer to adjust the edge contours of a respirator mask incorporating a filter medium to his face. The process includes the steps of depositing on a foraminous suction mold having the surface contours desired for the interior of the filter medium, a thin fibrous backing layer of solids by drawing an aqueous slurry comprising resilient fibers and a binder material to the foraminous mold and passing water from the slurry through the foraminous mold and whereby the solids deposit on the mold. Subsequently, a filter layer of solids is deposited on the thin backing layer of solids. The solids deposited in the filter layer comprise fine diameter fibers and larger resilient fibers. The filter layer is also deposited from an aqueous slurry, by drawing the slurry to the foraminous mold and passing water from the slurry through the backing layer of solids and the foraminous mold. The filter medium is cured to set the binder either while on the mold or after its removal from the mold.

The invention provides a respirator mask which is efficient, comfortable to wear, light weight, does not require excessive breathing effort, does not interfere with vision, is compatible with glasses and permits voice communication at short distances. The novel layered structure of the filter medium provides sufficient strength and resiliency, so that the filter medium can form the majority of the surface area of the mask. The large effective area for filtration insures low resistance to breathing and avoids an uncomfortable clammy feeling that is created by many masks. Also, the fibrous structure of the individual layers of the filter medium provides unexpectedly superior filtration efficiency and low resistance to breathing even after heavy loading of the respirator with particulate material.

DESCRIPTION OF THE DRAWINGS

The accompanying drawings illustrate preferred embodiments of the invention, and together with the detailed description of the invention serve to explain the principles of the invention.

Of the drawings.

DESCRIPTION OF THE PREFERRED EMBODIMENT

Figure 1:
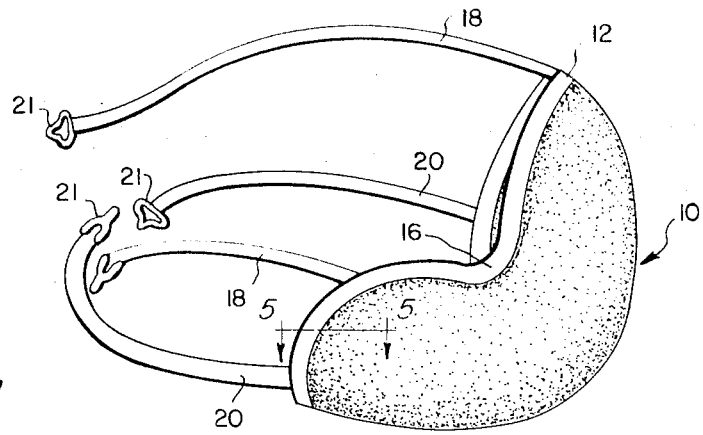
FIG. 1 is a perspective view of one form of the face respirator of the present invention.
Figure 2:
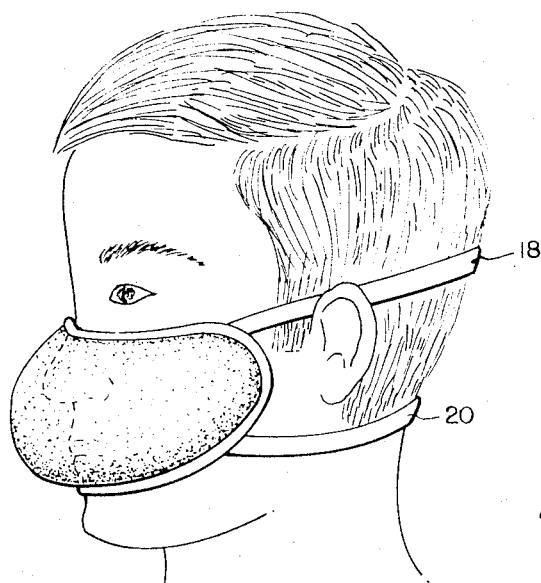
FIG. 2 is a perspective view of the face respirator of FIG. 1 in actual use and illustrates the manner in which it is worn.

As here embodied and as illustrated in FIGS. 1 and 2, a respirator mask is provided including a filter medium generally indicated at 10 and edge sealing means 12.

Edge seal means 12 is manually deformable so that is can be conformed to the human face and has an upper edge portion that is centrally recessed as indicated at 16 to receive the bridge of the wearer's nose. The respirator mask fits over and covers the user's nose and mount and is held in place by mating pairs of elastic bands 18 and 20 having end fasteners 21 attached thereto.

In accordance with the invention, the filter medium is formed by at least two fibrous layers in laminar relationship including a backing layer which contributes strength and resilience and a filter layer that effectively prevents penetration of fine particulate materials.

The exterior surface of filter medium 10 is convex so that the top portion of the filter medium extends from adjacent the face in a downward direction while curving outwardly away from the face to extend over the nose. The bottom portion of the mask curves downwardly and inwardly toward the chin of the wearer as shown in FIG. 2.

Since the filter medium forms the majority of the face piece of the respirator, and preferably forms almost the entire surface area of the respirator, it must be strong enough to withstand the rigors of wear, handling and abuse, and yet flexible enough to yield when manually deformed by the wearer or by pressure applied by an elastic band that extends about the back of the wearer's head, to conform the edge seal means to his face. These criteria require that a flexible binder be incorporated in the filter medium to bond the fibers together.

An important reason for the incorporation of one or more backing layers in the respirator mask is the need to prevent fine fibers from being inhaled by the wearer. The fine fibers tend to be easily dislodged by abrasion unless a sufficient amount of binder is utilized. The provision of two backing layers effectively prevents the escape of fine fibers from the mask which might otherwise result if the filter layer were exposed and subject to abrasion.

A subsidiary reason exists for the layered construction. If the filter were formed of a single layer of fiber and binder, the amount of binder necessary for imparting strength and cohesiveness might tend to fill the pores or interstices between the fibers, and thus could excessively increase the mask's resistance to breathing. By providing at least two fibrous layers, one layer primarily for strength and the other primarily for filtration, this problem can be avoided. The backing layer or layers used primarily for strength should consist of strong, stiff, relatively coarse fibers, such as acrylic fibers or high tenacity rayon fibers, and binder.

The backing layer fibers are selected to be coarse enough so that when interfelted by a vacuum molding process, they form a fibrous layer containing pores that are too large to become plugged by the binder, which is used in amounts necessary for adequate strength. Because the backing layer helps provide the needed strength, resiliency, and abrasion resistance, no binder or a reduced amount of binder need be used in the filter layer which contains fine fibers. Thus, binder plugging of the filter layer is avoided without interfering with the filtration efficiency of the overall filter medium.

Figure 5A:
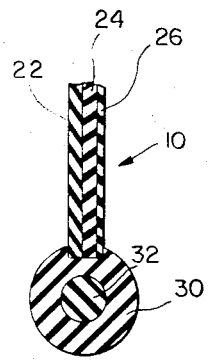
FIG. 5A is an enlarged partial sectional view taken on line 5—5 of FIG. 1, showing one type of edge seal.
Figure 7:
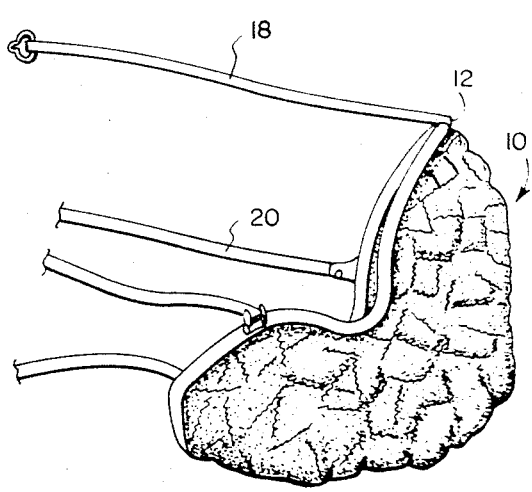
FIG. 7 is a perspective view of the face respirator, showing a corrugated surface on the filter medium.

Preferably, and as illustrated in FIG. 5A, filter medium 10 includes a first backing layer 22, a filter layer 24, and a second backing layer 26 with filter layer 24 positioned between the two backing layers. Backing layers 22 and 26 are each formed of short lengths of from about ⅛ inch up to about ½ to ¾ inch, of a strong stiff resilient fiber, having a resilient water-insoluble binder distributed over the fibers. Fibers of about ⅛ inch or more in length tend to produce surface corrugations as illustrated in FIG. 7, discussed more fully below. The fibers in the backing layer can be of either random or graded lengths. They should be strong, stiff, and resilient and be capable of forming a highly porous interfelted layer of fibers when drawn onto a forming die or mold from an aqueous slurry. The fibers should be non-skrinking when subjected to moderate heat to which the mask may be subjected when curing the binder. Suitable fibers include rayon, such as "Fortisan," and various synthetic fibers such as acrylics, polypropylene, polyethylene, polyesters and polyamides. For example, these fibers can be of a denier of from less than 1 to about 1.5.

The binder incorporated in the backing layer performs the important function of binding the fibers in the backing layer together and imparting strength, abrasion resistance, and shape retention to the final article. The binder should not detract from the resiliency of the fiber in the backing layer, and should of course be selected to adhere to the fiber used in the backing layer.

The binder is preferably one that can be deposited on the fibers from latex emulsions, such as polyacrylate, or a styrene-butadiene rubber (SBR). Other functionally equivalent synthetic organic resin binders can be used since the purpose of the binder is to impart physical properties of strength and cohesiveness to the backing layer. Thus, the exact chemical composition of the binder is not critical per se. Preferably, the binder is present in the backing layer in amounts of from about 20 percent to about 60 percent by weight based on the dry weight of the backing layer.

Figure 9:
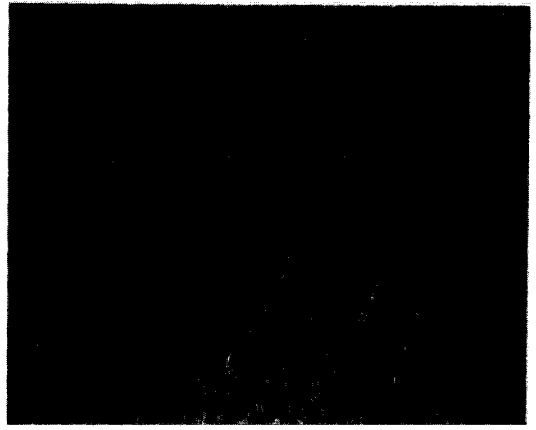
FIG. 9 is a photomicrograph looking down on a backing layer and illustrating the fibrous structure of the backing layer after its upper surface has been removed.

As illustrated in FIG. 9, the fibers in any given small area of the backing layer are interfelted, that is, they intersect one or more other fibers in the area. The fibers are irregularly arranged and form an irregular matrix that permits large volumes of air to pass therethrough with only a very small pressure drop. Binder is uniformly dispersed on the fibers, with no agglomerated binder being visible to clog up the pores of the fibrous matrix.

Filter layer 24 includes fine diameter fibers and strong resilient fibers of a larger diameter. The fibers of the filter layer tend to form a compact interfelted mass having small pores or interstices extending downwardly across the thickness of the filter layer and distributed throughout the surface area of the filter layer when drawn from a dilute aqueous slurry onto a foraminous mold. The strong resilient fibers are included in the filter layer to provide the necessary strength and resiliency and to act as a spacing means to prevent overcompaction of the finer fibers. Preferably, the filter layer includes from about 4 to about 20 percent by weight of the fine fibers. It should be understood that the smaller the average diameter of the fine fibers used, the smaller is the weight percent of these fibers that is necessary to obtain good filtration efficiency. Also, when fine fibers having larger average diameters are used, larger amounts of the fine fibers can be present without causing excess breathing resistance. For example, when the fine fibers have diameters approaching about 1.6 microns, these fibers can be present in an amount over 20 percent; even 100 percent of the fine fibers can be used in the filter layer when fine fibers of larger average diameters, such as, for example, about 1.6–2.6 microns, are employed.

It is believed that the highly efficient filtering action which is a characteristic of the filter medium of this invention results from the physical as opposed to the chemical nature of the fibers incorporated in the filter layer, and from the structural organization of these fibers produced by the process of forming the filter medium. Thus, it is possible to select the fine diameter fiber from a variety of materials including glass, and a variety of synthetic organic polymers which can be formed into fibers which have desirable properties, such as stiffness, similar to those of glass fibers. These fibers can include polyvinyl chloride, polyamides, and polypropylene. Glass fibers are however presently preferred. The larger diameter, strong, resilient fibers can be selected from the fibers described above for incorporation into the backing layer.

To provide adequate strength and cohesiveness for the overall structure of the filter medium, it is desirable to include two backing layers, layers 22 and 26, that cover both sides of filter layer 24. An added advantage of the use of two backing layers is the elimination of any possibility of the fine fibers, such as glass, in the filter layer causing skin irritation. It appears that there is no appreciable tendency for the fine fibers to migrate through the backing layer, even when large volumes of air are passed through the mask at a rapid rate.

Figure 8:
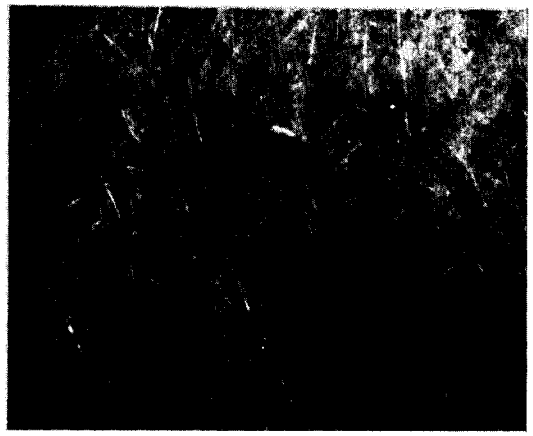
FIG. 8 is photomicrograph looking down on a filter layer and illustrating the fibrous structure of a filter layer after its upper surface has been removed.

FIG. 8 illustrates the appearance of a filter layer formed of rayon and glass fibers. FIG. 8 and FIG. 9 were taken at the same degree of magnification which permits comparing the more open structure of the backing layer of FIG. 9 with the tighter, more compact structure of the filter layer FIG. 8. The dispersion of the rayon and glass fibers is apparent in FIG. 8, since most glass fibers at the surface of the photographed piece of filter layer tend to reflect light and are shiny.

In accordance with the invention, edge seal means are provided for preventing leakage of air between the edge portions of the filter medium and the wearer's face. These edge seal means can be of any non-toxic, non-irritating, non-allergenic material which has no biological activity. Any sealing construction that is flexible to permit bending and contouring the edge seal to the wearer's face can be utilized. Also, the edge seal means prevent the penetration of air through the edge portion of filter medium 10 and into the interior of the mask without passage through the filter layer.

The edge seal means can be attached to the filter medium by separate means, such as by adhering the sealing means to the edge of the filter medium with an adhesive or by heat sealing.

The edge of the filter medium can itself comprise the edge sealing means since the peripheral portion of the filter medium, when stressed by an elastic band extending around the back of the wearer's head, tends to move into sealing contact against the face.

FIGS. 5A, B and C illustrate typical edge seal means. FIG. 5A illustrates the edge of the filter medium 10 attached to edge sealing means comprising a grooved elastomeric band 30. A ductile wire 32 is centrally located in the elastomeric band to allow the sealing means to be bent and contoured, and then held in the necessary configuration to fit it tightly against the wearer's face. The elastomeric band 30 can be cast in place around filter medium 10 or can be adhesively secured to the filter medium.

Figure 5B:
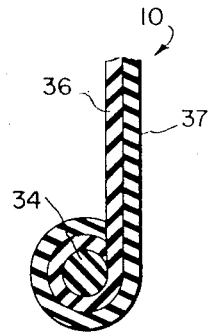
FIGS. 5B and 5C are views similar to that of FIG. 5A, but show modifications of the filter medium and the edge seal.

In FIG. 5B, a two layer filter medium 10 is illustrated that includes a backing layer 36 and a filter layer 37. In this embodiment, the edge portion of filter medium 10 functions as the edge seal means and is wrapped around a ductile wire 34 which imparts body and conformability to the seal. The filter medium can be formed first, and the edge portion then wrapped around the wire. In this structure, the wire is adhered to the filter medium with an adhesive. The wire can also be affixed to the mold used in forming the filter medium and the medium formed about the wire to make the wire an integral part of the mask structure.

Figure 5C:
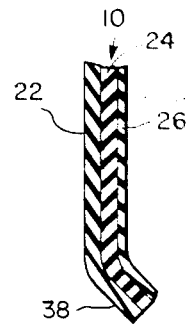

Another embodiment in which the edge portion of the filter medium functions as the edge seal means is illustrated in FIG. 5C. The edge portion 38 of filter medium 10 is deflected at a slight angle to the adjacent portion of the filter medium to improve the sealing effect when the edge portion is urged toward the wearer's face by the action of the elastic band.

If desired, the edge portion of the filter medium can have a different laminar structure than that of the remainder of filter medium 10. This differentiation may be desirable to provide added strength, or to insure that the fine filtering fibers remain out of contact from the skin. A technique for providing an edge structure that differs from the structure of the remainder of the filter medium is described below.

Figure 6:
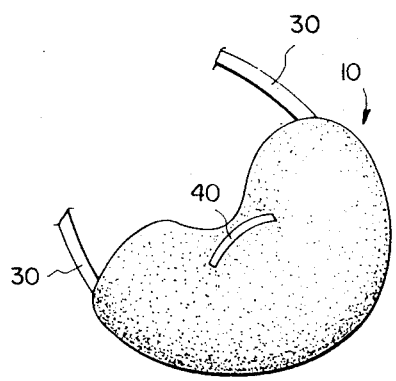
FIG. 6 is a perspective view of the face respirator, showing a modified arrangement.

In embodiments of the invention in which no wire or other rigid reinforcement extends around the periphery of the filter medium, it is desirable to add a reinforcing material at the critical area over the bridge of the nose. This arrangement is illustrated in FIG. 6 in which a flexible, ductile strip 40, which may be selected from a metal, elastomer, or plastic which posseses these properties, is attached to filter medium 10 and is positioned to extend transversely of the bridge of the wearer's nose. By contouring this strip to the shape of the bone structure of the bridge of the nose, the snubbing action of an elastic band 39 that extends around the back of a wearer's head is sufficient to produce an adequate edge seal for all portions of the mask including the nose.

Figure 4:
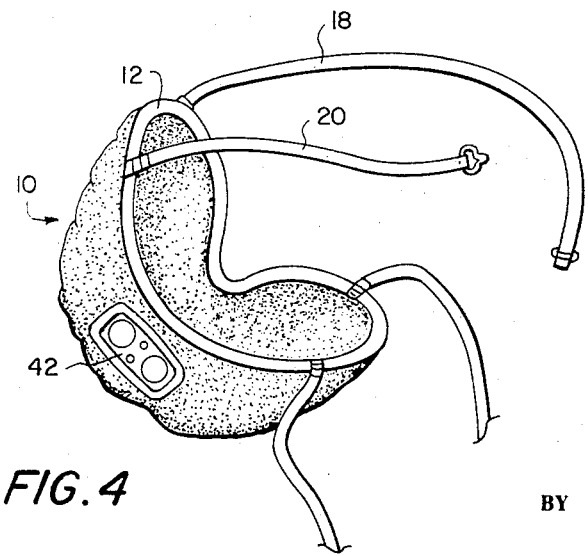
FIG. 4 is a perspective view of the bottom of a respirator similar to the respirator of FIG. 1, but including an exhalation valve.

As illustrated in FIG. 4, the respirator mask can include an exhalation valve 42, although the filter medium itself usually permits confortable exhalation. Valve 42 can be a commercially available, inexpensive flapper valve. A void space is provided in the filter medium by either cutting out a portion of the filter medium or by using a forming mold having an imperforate area where the void space is desired. The valve is inserted in the void space and extends completely across the void space.

The mask is produced by a process in which the filter medium is shaped during the forming process to present edges that conform to a human face. The process insures formation of filter media that are strong, and efficient in entrapping extremely fine airborne particulate matter, and yet are comfortable because they offer low breathing resistance and are deformable to permit a wearer to manually, or by strap tension, adjust the edge contours of a mask to his face. Because the filter medium is formed in the shape in which it is to be used, no pressing or bending operation is needed to drastically alter the configuration of the filter medium, and the possibility is avoided of mechanically disrupting the fiber arrangement of the filter medium with a resultant loss of either efficiency or effective filter area.

The filter media produced by the present process permit air to pass freely therethrough to avoid excessive breathing effort, but are highly efficient in removing fine airborne particulate matter. The attainment of efficient filtration and ease of breathing is believed to partially result from the formation of the filter medium from at least two distinct slurries, and from the fact that the slurry-deposited filter medium possesses interstices extending across the thickness of the medium and spread throughout the surface area of the medium.

In accordance with the process, a thin fibrous backing layer of solids is deposited on a foraminous mold having the surface contours desired for the interior surface of the filter medium. The fibrous layer of solids is drawn to the mold surface from a dilute aqueous slurry containing strong resilient fibers and a resilient binder by applying a pressure differential across the foraminous mold. Suitable fibers and binders and the criteria for their selection have been described above for use in the backing layer or layers of the respirator mask. The binder is preferably deposited on the fibers by breaking an emulsion of the binder prior to forming the backing layer. Subsequently, a filter layer is deposited on the backing layer with the filter layer comprising preferably from about 4 to about 20 percent or more by weight of fine diameter fibers. Preferably, a second backing layer is then deposited on the exposed surface of the filter layer. It should be understood that in most cases, fibers from the layer being deposited extend somewhat into the pores or interstices of the previously deposited layer.

Figure 3:
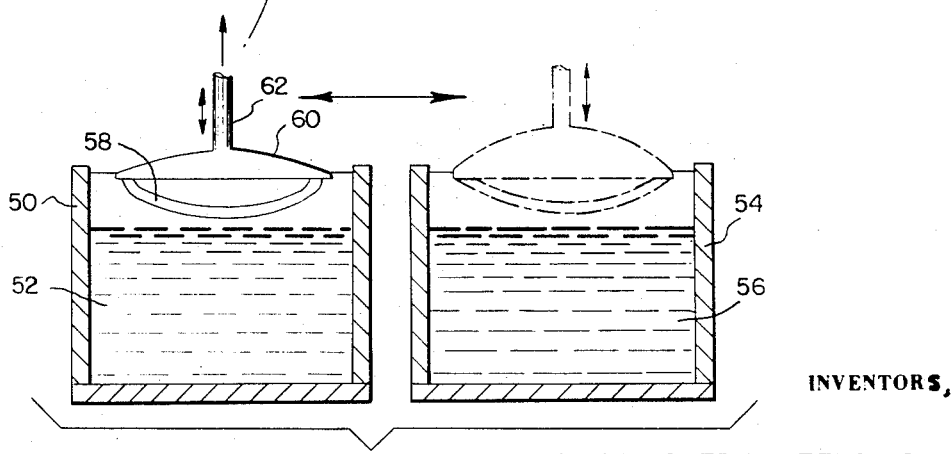
FIG. 3 is a schematic representation, shown partly in section, of an apparatus used in a preferred method for forming the filter medium of the face respirator.

A plural dip vacuum forming technique is preferably used in the manufacture of the filter medium, although positive pressure could be applied to the aqueous slurry to create the pressure drop across the mold. As illustrated in FIG. 3, the vacuum forming technique utilizes a tank 50 which contains a first fibrous slurry 52 and a second tank 54 which contains a second fibrous slurry 56 having a different composition from that of slurry 52.

A foraminous mold 58 is attached to an air tight carrier 60 to which a conduit 62 is connected. The conduit 62 connects the interior space between mold 58 and carrier 60 to a source of vacuum, which is applied through the conduit to the interior surface of the mold when the mold is immersed in the fibrous slurry 52 which is the precursor of the backing layer and includes the resilient fibers and a binder. The vacuum causes passage of the liquid in the slurry through mold 58 and the deposition of solids from the slurry 52 on mold 58. It is this deposition of solids on mold 58 that forms a fibrous backing layer for the respirator. After a layer of solids of the desired thickness has been deposited, conduit 62, carrier 60 and mold 58 are removed from the tank 50 and inserted into fibrous slurry 56 in tank 54 while maintaining the interior of the mold and carrier structure under suction. Fibrous slurry 56 is the precursor of the filter layer and contains the fine diameter fibers as well as the resilient fibers if employed. The filter layer is formed by drawing the slurry to the mold and passing liquid from the slurry through the backing layer of solids and the mold.

If a two layer mask is desired, the mold is then removed from the tank 24, the vacuum is discontinued and positive air pressure is applied through the conduit to remove the fibrous layers formed on the outer surface of the mold. The filter medium is preferably cured to set the binder, either while on the mold or after removal therefrom. Preferably, however, a third fibrous layer that forms a second backing layer is deposited on the mold by again inserting mold 58 in a slurry, for example slurry 52, and drawing a vacuum to deposit a layer of fibrous solids on the filter layer.

The exterior surface of foraminous mold 58 is shaped to have the dimensions of the desired interior surface of the filter medium. Mold 58 can be made from any suitable porous material such as, for example, highly porous ceramic material such as firebrick, or a fine mesh screen.

As briefly mentioned above in describing the embodiment of FIG. 5C, the edge portion of the filter medium can be of a different laminar structure and composition than the remainder of the filter medium. A different laminar structure or composition may be useful for strength purposes or to insure that the fine filtering fibers in the filter layer remain out of contact with the skin. This differentiation can, for example, be accomplished by dipping the mold completely into slurry 52 containing strength-providing fibers and binder to include these fibers in the edge seal portion, and dipping the mold into the slurry containing the fine fibers without immersing the edge seal portion so that no deposition of the fine fibers occurs on the edge seal portions.

Generally, it is desirable that the aqueous slurries be very dilute to insure that the solids in the slurries remain uniformly distributed throughout the slurry. Solids concentrations of from about 0.015 to about 0.03 percent by weight based on the total weight of the slurry are preferred.

The amount of the pressure differential applied across the forming mold is a factor in determining the speed of the molding operation and has some effect on the characteristics of the deposited fibrous layers. Generally, for dilute slurries, the pressure differential across the mold for depositing the first fibrous layer is from about 1 to about 10 inches of mercury. The pressure differential is usually increased for each succeeding layer, since the deposited solids act as a filter cake. As the thickness of the deposited solids increases, the filtration rate is slowed. It should be understood that the desired pressure differential across the mold depends on several factors including the porosity of the mold, the porosity of the first formed layers, and the nature of the slurry. Thus, under some circumstances it may be desirable to use pressure drops above or below the above-cited range.

Surface corrugations are generally formed at the surface of a deposited fibrous layer if the aqueous slurry used to form the layer contains fibers of ⅛ inch or more in length, and the preferred pressure differentials are applied across the mold. These surface corrugations, such as illustrated in FIG. 7 can greatly increase the surface area of the mask, and may contribute to the ease of breathing afforded by the mask even after heavy loading with particulate matter.

For a clearer understanding of the invention, specific examples of it are set forth below. These examples are illustrative, and are not to be understood as limiting the scope and underlying principles of the invention in any way. All percentages listed in the specification and claims are weight percentages unless otherwise noted.

EXAMPLE I

Filter media for respirator masks are vacuum-formed on a porous firebrick mold. The mold is shaped to the desired form, and a rubber diaphragm is cemented to the back of the mold to allow application of vacuum. The filter medium is formed by dipping the mold under a vacuum of about 1 in. of mercury into a backing layer slurry, and then dipping the mold into a filter layer slurry. Subsequently, the vacuum is released, and the filter medium is blown off the mold by positive air pressure.

The slurry used to form the backing layer contains fine denier, high tenacity rayon fibers and binder. The filter layer contains fine glass fibers, high tenacity rayon fibers and some binder. The aqueous slurries used to form the backing layer and the filter layer are each prepared in five gallon quantities. Each respirator mask is formed by depositing 1.25 gallons of each slurry on the mold.

The slurry compositions used in forming the respirator mask are shown below:

|  | Slurry For Backing Layer | Slurry For Filter Layer |
|---|---|---|
| ⅛–½ in. lengths of random-cut high tenacity rayon fibers (a product of Celanese sold under the trademark FORTISAN) having diameters of about 10 microns | 6.00 gm | 6.00 gm |
| 1.6–2.6 micron diameter glass fibers (a product of Johns-Manville Corporation sold under the trademark MICRO-FIBER) |  | 3.51 gm |
| 0.5–0.75 micron diameter glass fibers (a product of Johns-Manville Corporation sold under the trademark MICRO-FIBER) |  | 1.27 gm |
| acrylic resin binder (50% solids by weight) (a product of B. F. Goodrich Chemical Co. sold under the trademark Hycar No. 2600 × 120) | 10 ml | 3 ml |
| 1 M NaOH | 200 ml | 100 m |
| Water | Sufficient to give 5 gallons of slurry | |

The fiber constituents are added to the slurries from concentrated stock suspensions having the following concentrations:

| FORTISAN rayon fibers | 1.5 gm/650 ml |
|---|---|
| MICRO-FIBER glass fibers (1.6–2.6 micron) | 0.4 gm/100 ml |
| MICRO-FIBER glass fibers (0.5–0.75 micron) | 0.25 gm/100 ml |

The stock FORTISAN suspension is made by mixing the fiber and water for 1 minute in a Waring Blender. The stock MICRO-FIBER suspensions are made by mixing for 30 seconds in a Waring Blender and then bringing the suspension to pH 3 with 0.1 N HCl to achieve efficient dispersion.

The double dip method in which the mold is dipped into two distinct aqueous slurries results in a two layer element. The backing layer provides strength to the element. The second layer, the filter layer, imparts the filtration properties due to the glass fiber content. The coarser fibers in the filter layer act as a spacing means to provide the desired pressure drop characteristics and also add to the overall strength of the filter medium. Although the two layers exhibit a tendency to remain in overlying relationship, they can be separated by prying their edges apart. After blowing telement off the mold, it is dried at 110°C for about one hour to cure the binder. The filter medium produced by the process has a very wrinkled surface appearance and a surface area of 32 square inches.

The edge seal means for the respirator mask is formed by an extrusion process in which silicone rubber and an 0.061 inch diameter aluminum wire are extruded thorugh a die to produce a grooved edge seal means having approximately the general configuration illustrated in FIG. 5A. A 14-inch piece of the extruded material is cut and formed into a ring and the ends cemented together. The filter medium is cemented in the groove of the edge seal means with a silicone adhesive, sold by Dow Corning under the name "Glass and Ceramic Adhesive."

A flapper type exhalation valve is inserted in the filter medium in the lower portion of the mask as shown in FIG. 4, after cutting out a portion of the filter medium to create a void space.

The filtration efficiency of the filter medium formed according to the above procedure is tested by passing silica-laden air through the mask at 32 liters per minute. A 0.8 micron Millipore filter manufactured by Millipore Filter Corporation is used to catch any silica which passes through the mask. The mask and the Millipore filter are weighed before and after the test. The weight increase of the Millipore filter is divided by the weight increase of the mask plus the weight increase of the Millipore filter, to arrive at the precent silica breakthrough. The calculated precent silica breakthrough is less than 2 percent.

The reaction of persons after wearing the mask produced by the above procedure is generally favorable because the mask provides low breathing resistance.

EXAMPLE II

Three masks made in accordance with the procedure set forth in Example I are subjected to a silica dust test. The masks are cemented onto a brass frame which is placed in a standard silica dust test chamber containing silica particles having an average particle size ranging from 1.3 microns to 0.6 microns. Air is drawn from the mask at 32 liters per minute. A glass fiber filter capable of stopping almost 100 percent of the silica particles charged to it is placed behind the mask, and is weighed before and after the test to determine the silica breakthrough.

During the 90 minute test, the silica concentration is monitored every 20 minutes to insure that the silica concentration is from between 50 to 60 milligrams per cubic meter during the test. Inhalation and exhalation resistances are tested at 85 liters a minute before and after the silica test. The following table reflects the silica penetration, exhalation resistance, and inhalation resistance data for the three tested masks.

As seen by the results of the test listed in Table I, even after the new face respirator masks of this invention are heavily loaded with silica, only a small increase in inhalation resistance results.

TABLE I

|  | Sample 1 | 2 | 3 |
|---|---|---|---|
| Initial inhalation resistance (mmH$_2$O) | 9.0 | 7.0 | 7.5 |
| Final inhalation resistance | 14.0 | 11.0 | 11.0 |
| Initial exhalation resistance | 8.0 | 7.5 | 8.5 |
| Final exhalation resistance | 11.0 | 11.0 | 10.5 |
| Silica breakthrough (mg) | 1.5 | 3.0 | 2.6 |
| Challenge toncentration (mg/m$^3$) | 64.7 | 58.9 | 55.7 |
| Per cent penetration | 0.80 | 1.77 | 1.65 |

EXAMPLE III

Multilayer filter media for dust respirator masks, which include a pair of exterior backing layers and an interior filter layer, are formed on a porous wire screen mold.

The surface of the mold has the configuration of the desired interior surface of the mask. The filter media are formed by the layered deposition of two different aqueous slurries using apparatus similar to that illustrated in FIG. 3. The working slurry used for forming the backing layers includes 0.16 grams per liter of acrylic fibers sold under the trademark CRESLAN by American Cyanamid and designated Type 61. These fibers are 1.5 denier and are nominally ⅜ in. in length. About 0.13 grams per liter of solids from an acrylic latex emulsion (Hycar No. 2600 × 137) is deposited on the fiber. The backing layer working slurry also contains a small amount of wetting agent. Sodium hydroxide is added to break the latex emulsion and to deposit the latex on the fiber. Subsequently, the slurry is diluted to the working consistency described above.

For the filter layer, a working slurry is formulated which contains 0.159 grams per liter of acrylic fiber (CRESLAN Type 61) and 0.041 grams per liter of MICRO-FIBER glass fibers having a diameter of from 0.5 to 0.75 microns.

Filter media are formed by first depositing a backing layer containing about 0.375 grams of fiber and 0.312 grams of binder on the mold by drawing up 2.37 liters of the backing layer working slurry. A vacuum of about 1 inch of mercury is applied across the mold to draw up the slurry. Subsequently, a filter layer is deposited on the mold by withdrawing 4.75 liters from the filter layer working slurry under a vacuum of about 6 inches of mercury. An outer backing layer is deposited on the mold by withdrawing from the backing layer working slurry 4.75 liters of slurry under a vacuum of about 10 inches of the mercury. The filter medium is then blown off the mold by positive air pressure and held at about 100°C for about 1 hour to cure the binder.

The filter medium provides desirable filtration efficiency and low breathing resistance and a mask that can be attached to a face piece by, for example, the procedure used in Example I.

EXAMPLE IV

The procedure of Example III is repeated except that ⅛ – ½ in. lengths of random-cut, high tenacity, approximately 10 micron diameter FORTISAN rayon fibers are substituted by the CRESLAN fibers. The resulting filter medium possesses the same desirable filtration efficiency and low breathing resistance that is exhibited by the medium produced by Example III.

It is to be understood that variations and modifications of the present invention may be made without departing from the spirit of the invention. It is also to be understood that the scope of the invention is not to be interpreted as limited to the specific embodiment disclosed herein, but only in accordance with the appended claims when read in the light of the foregoing disclosure.

What is claimed is:

1. A respirator mask conformable to the contours of a wearer's face comprising:
   A. a shape-retaining deformable filter medium formed from fibrous slurries and including,
      a. a backing layer comprising bonded interfelted resilient fibers selected from the group consisting of fibers of rayon, acrylic, polypropylene, polyethylene, polyester and polyamide, and
      b. a filter layer overlying said backing layer and comprising an interfelted fibrous mass possessing a plurality of pores extending across the thickness and the surface area of said filter layer, including coarse diameter resilient fibers selected from the group consisting of high tenacity rayon fibers and acrylic fibers, and at least about 4 percent by weight of fine diameter glass fibers, and B. edge seal means at the edge of said filter medium for preventing passage of air between the edge portions of said filter medium and the wearer's face.

2. The respirator mask of claim 1 wherein said edge seal means are deformable to the contours of the wearer's face.

3. The respirator mask of claim 2 in which said backing layer includes from about 20 to about 60 percent by weight of a synthetic organic resin binder uniformly distributed on the surface of the fibers.

4. The respirator mask of claim 2 in which said fine diameter fibers are glass fibers having average diameters in the range of 1.6 to 2.6 microns.

5. The respirator mask of claim 2 in which said filter medium includes irregular surface corrugations.

6. The respirator mask of claim 2 in which said filter medium includes a second backing layer comprising bonded, interfelted resilient fibers, said filter layer being positioned between said backing layer and said second backing layer.

7. The respirator mask of claim 2 in which said filter medium includes an exhalation valve in said filter medium.

8. The respirator mask of claim 2 in which said edge seal means is adhered to the peripheral portion of said filter medium and comprises a grooved elastomeric band having a ductile wire located centrally therein.

9. The respirator mask of claim 2 in which said edge seal means has an upper edge portion which is centrally recessed to receive the bridge of the wearer's nose.

10. The respirator mask of claim 1 wherein said fine diameter fibers have a diameter of up to about 2.6 microns.

11. The respirator mask of claim 1 wherein said fine diameter fibers have a diameter of up to about 1.6 microns.

12. The respirator mask of claim 1 in which said filter layer includes from about 4 to about 20 percent of said fine diameter fibers.

13. The respirator mask of claim 1 wherein said resilient fibers of said filter layer are non-skrinkable or low-skrinkable at a temperature adequate to cure the filter medium.

14. The respirator mask of claim 1 wherein said resilient fibers of said filter layer and said resilient fibers of said backing layer have a length in the range of from about ⅛ inch to about ¾ inch.

* * * * *